Aug. 21, 1934.    G. B. REED    1,970,625
METHOD AND APPARATUS FOR MAKING PILE FABRICS
Filed June 27, 1931    10 Sheets-Sheet 1
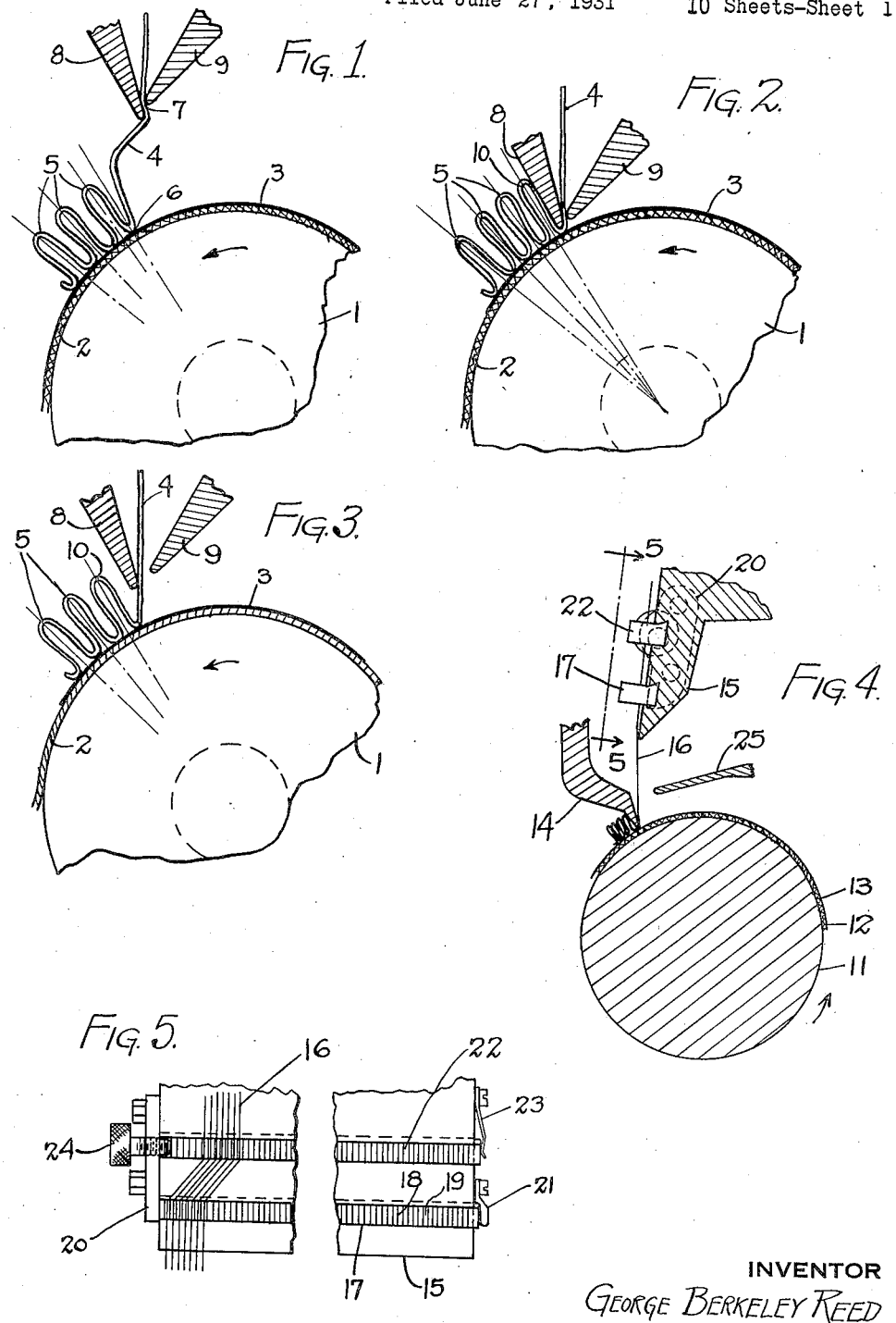
INVENTOR
GEORGE BERKELEY REED
BY HIS ATTORNEY Aug. 21, 1934.   G. B. REED   1,970,625
METHOD AND APPARATUS FOR MAKING PILE FABRICS
Filed June 27, 1931   10 Sheets-Sheet 2

INVENTOR
GEORGE BERKELEY REED
BY HIS ATTORNEY

Aug. 21, 1934.  G. B. REED  1,970,625
METHOD AND APPARATUS FOR MAKING PILE FABRICS
Filed June 27, 1931  10 Sheets-Sheet 3

INVENTOR
GEORGE BERKELEY REED
BY HIS ATTORNEY

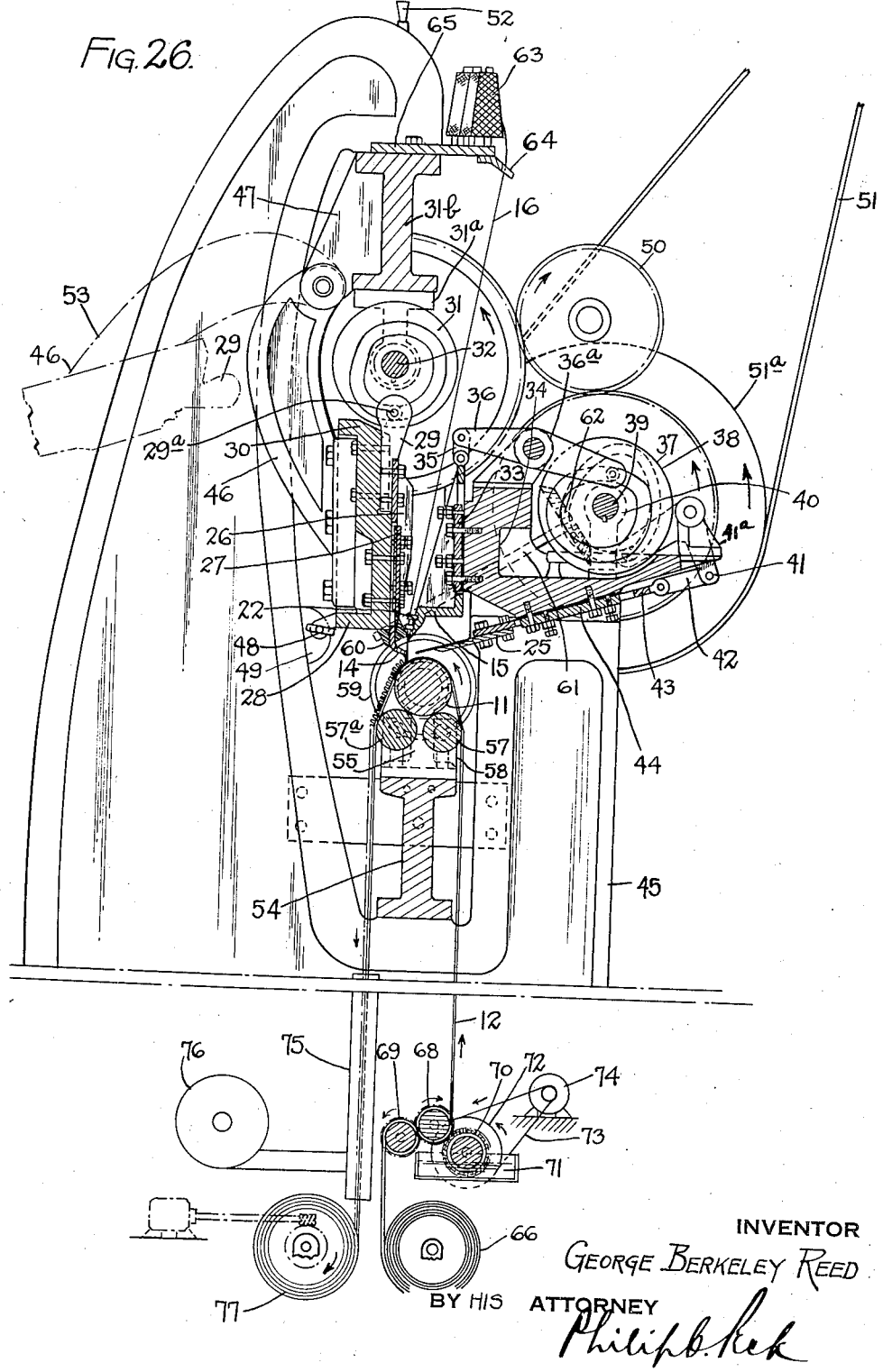

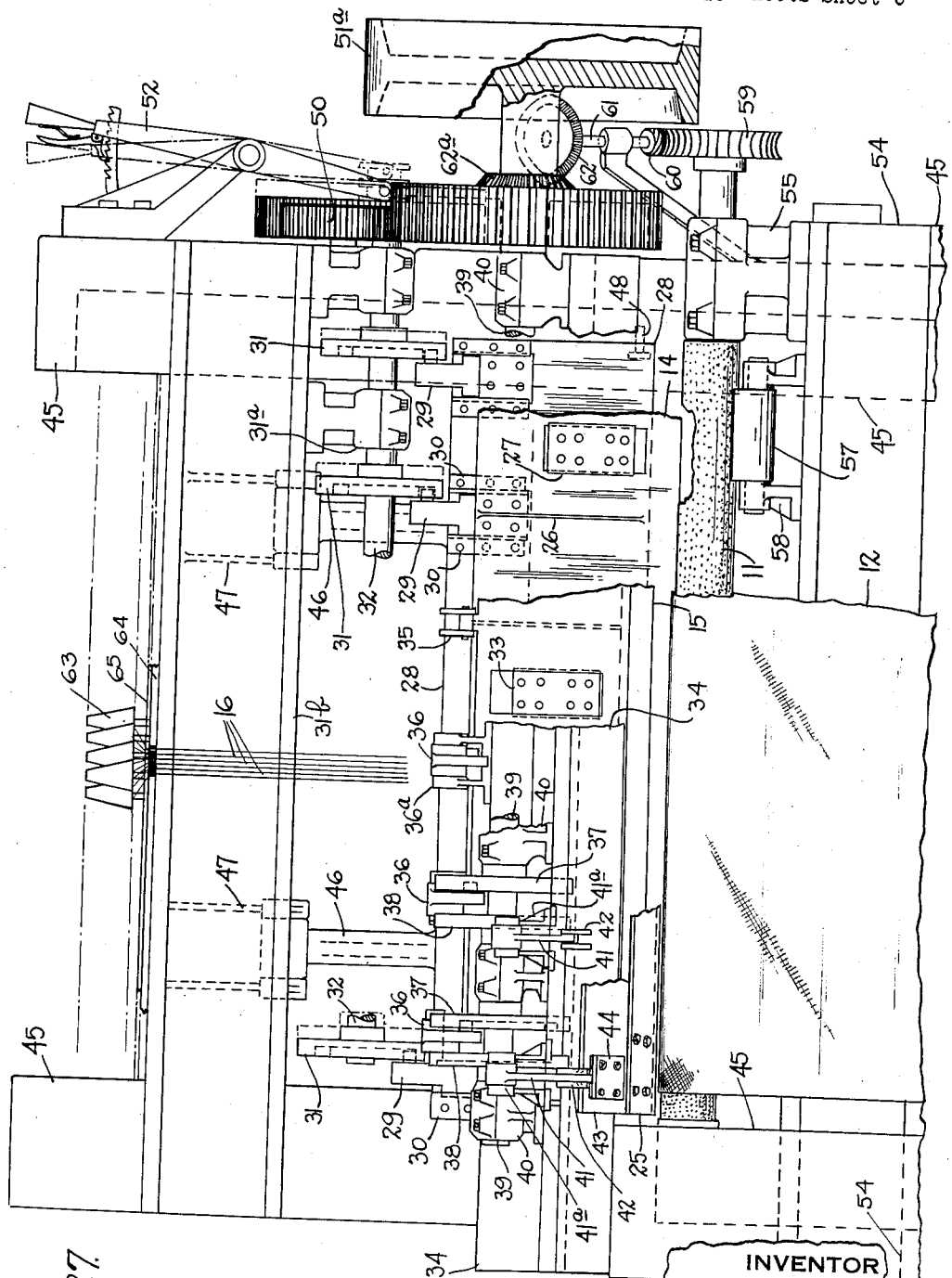

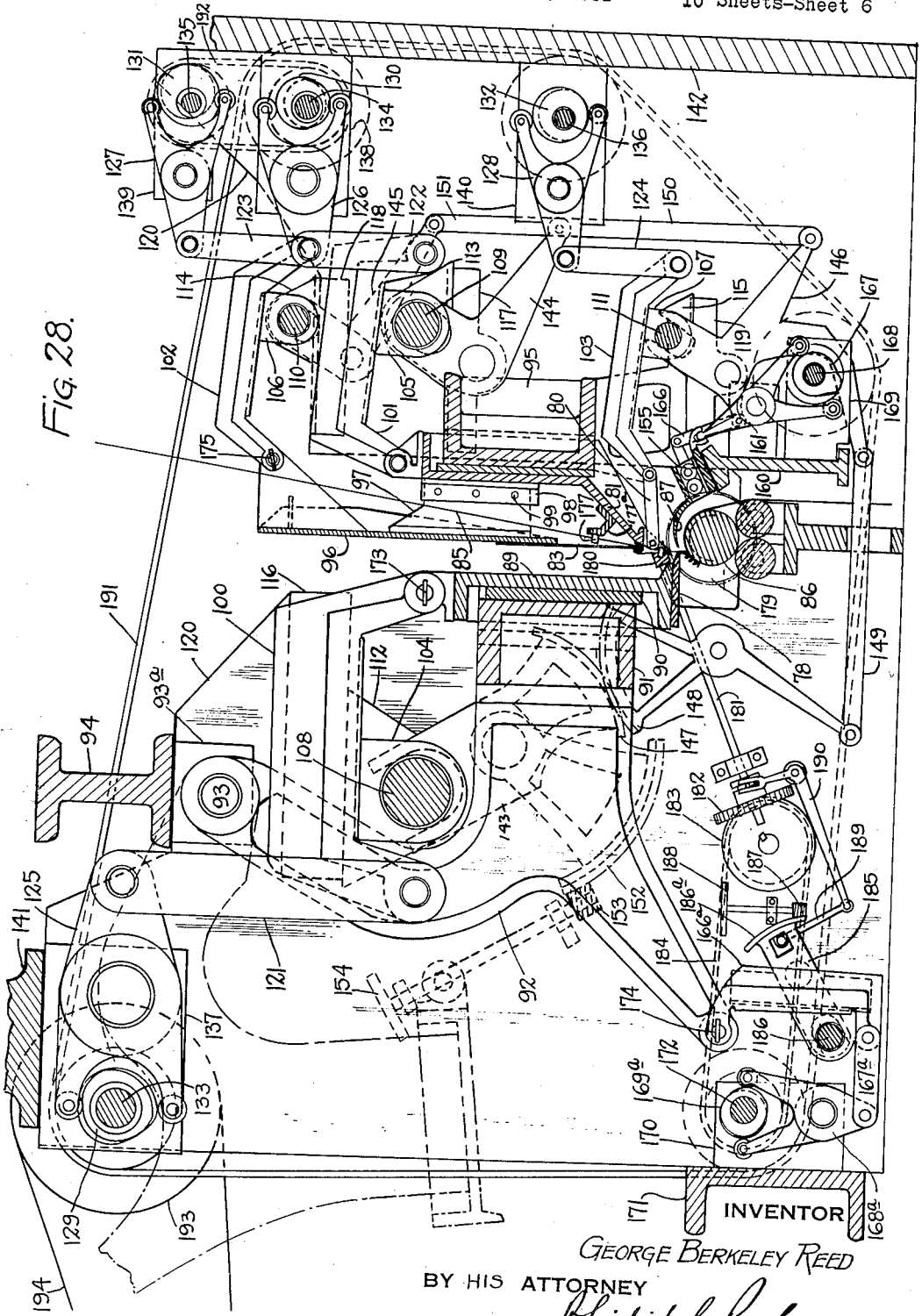

Aug. 21, 1934.  G. B. REED  1,970,625
METHOD AND APPARATUS FOR MAKING PILE FABRICS
Filed June 27, 1931  10 Sheets-Sheet 8

INVENTOR
GEORGE BERKELEY REED
BY HIS ATTORNEY

Aug. 21, 1934.  G. B. REED  1,970,625
METHOD AND APPARATUS FOR MAKING PILE FABRICS
Filed June 27, 1931   10 Sheets-Sheet 9
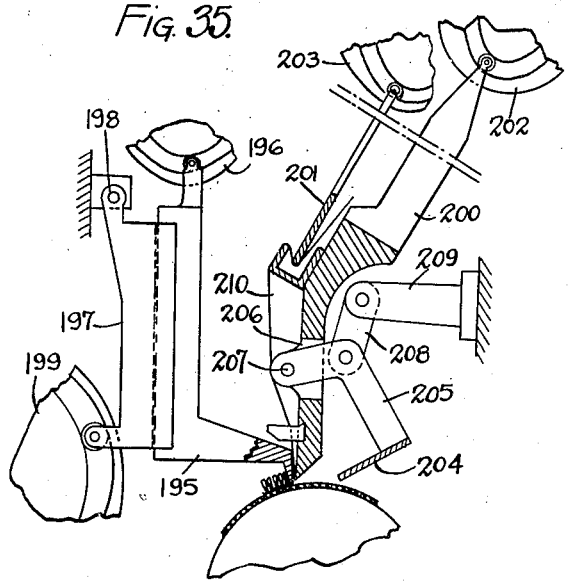
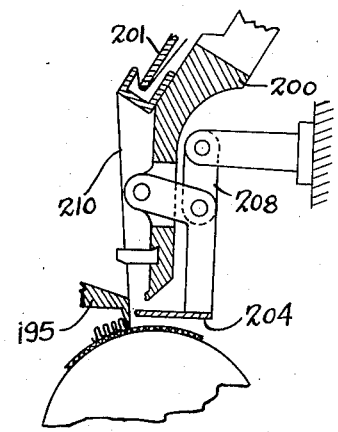
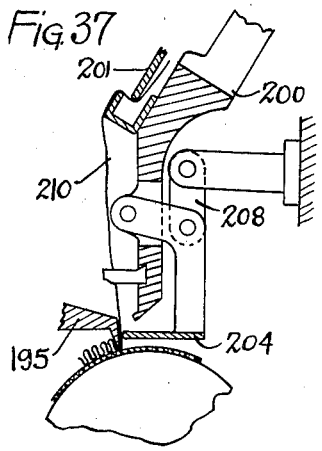
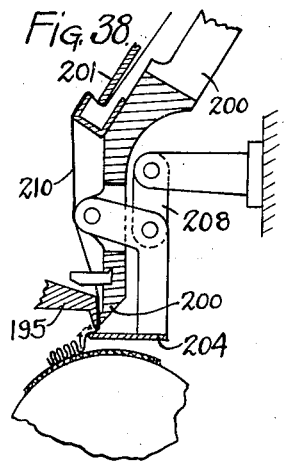
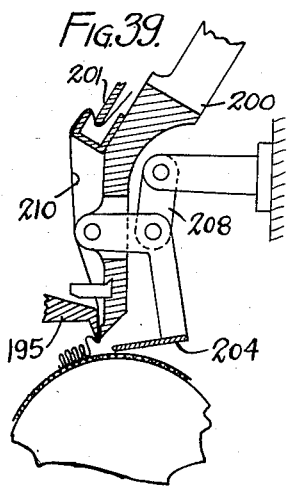
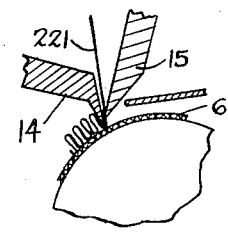
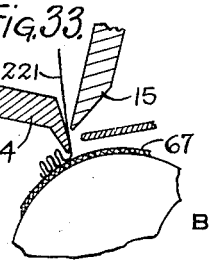
INVENTOR
GEORGE BERKELEY REED
BY HIS ATTORNEY Aug. 21, 1934.   G. B. REED   1,970,625
METHOD AND APPARATUS FOR MAKING PILE FABRICS
Filed June 27, 1931   10 Sheets-Sheet 10
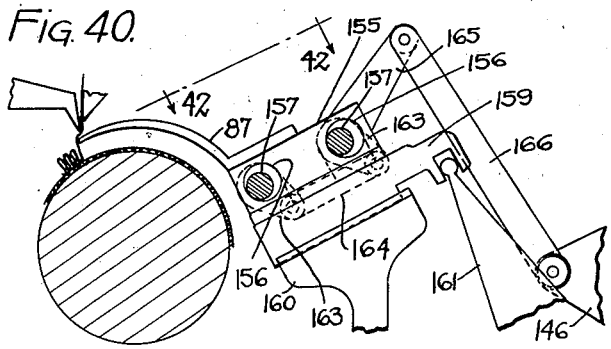
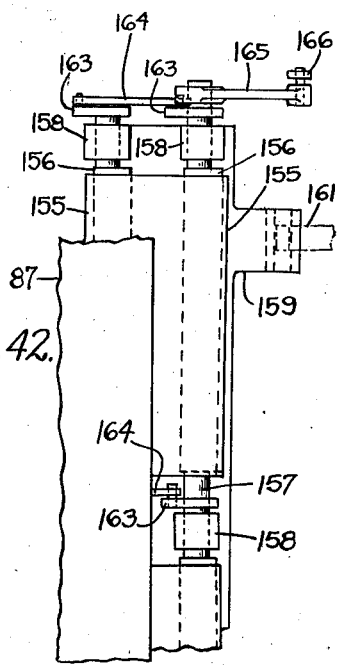
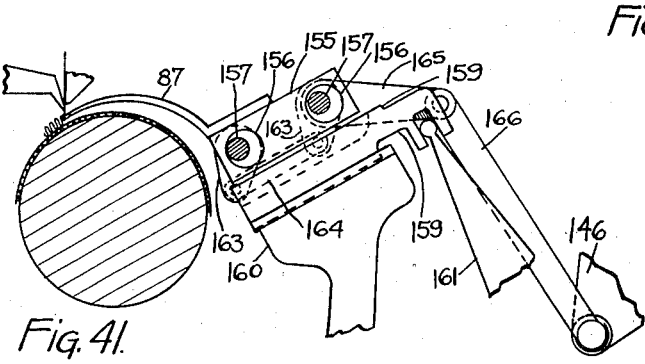
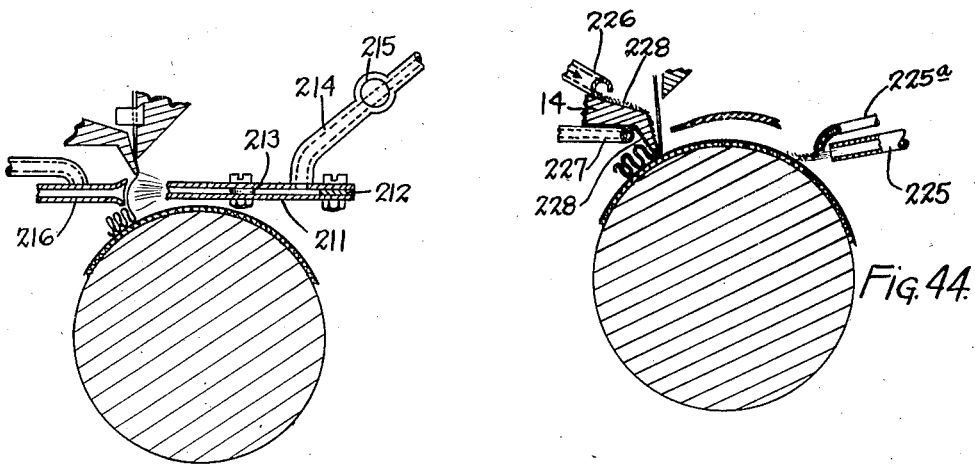
INVENTOR
GEORGE BERKELEY REED
BY HIS ATTORNEY Patented Aug. 21, 1934

1,970,625

UNITED STATES PATENT OFFICE 1,970,625

METHOD AND APPARATUS FOR MAKING PILE FABRICS

George Berkeley Reed, Brooklyn, N. Y., assignor of forty-five per cent to A. Thornton Baker and twenty-five per cent to William F. Meredith, both of Princeton, N. J.

Application June 27, 1931, Serial No. 547,312

59 Claims. (Cl. 154—2)

My invention relates to improved methods of, and apparatus for, making pile fabrics by cementing fibrous pile material to a backing cloth.

In the previous art of making such cemented pile fabrics, as contrasted with woven pile fabrics, the methods may be said to fall under two general classifications: (A) those methods in which separate tufts of fibres, fur, etc. are affixed by cement to a backing cloth, and (B) those methods in which a continuous sheet of batt, or a row of continuous threads or yarn is formed in successive loops either around or between some form of matrices, and while thus held are affixed by cement to the backing cloth.

My invention belongs to the latter classification with respect to the use of a substantially continuous batt or row of substantially continuous threads. However the underlying novel features of my invention reside in the fact that instead of transferring my formed loops to the backing cloth while the former are held in matrices, I affix the loops directly to the backing cloth without the use of matrices during the process of forming said loops, as will be hereinafter fully described and then particularly pointed out in the claims. Such novel methods and constructions will be apparent from the following description setting forth the several methods of procedure as well as the construction and operation of the machine or apparatus in detail.

In the accompanying drawings:—

Figs. 1, 2 and 3 are enlarged detail sectional views showing three positions of the operating parts in the fundamental cycle used in my improved methods in practicing the invention;

Fig. 4 shows in section certain specific means for producing the effect shown in Figs. 1 to 3, when using a row of substantially continuous threads as the pile material;

Fig. 5 is a section on the line 5—5 on Fig. 4;

Figure 25:
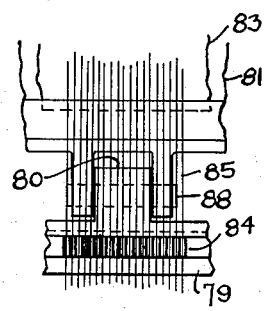
Figure 19:
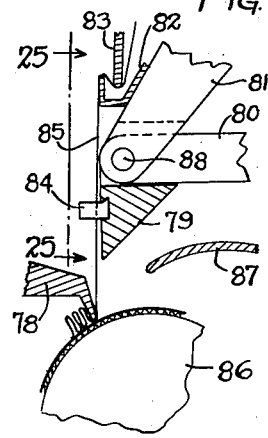
Figure 20:
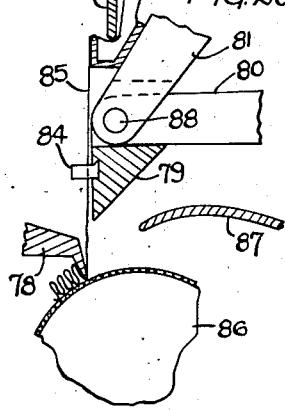
Figure 21:
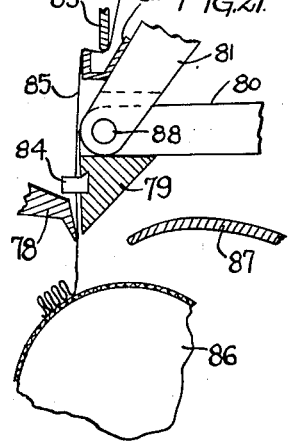
Figure 22:
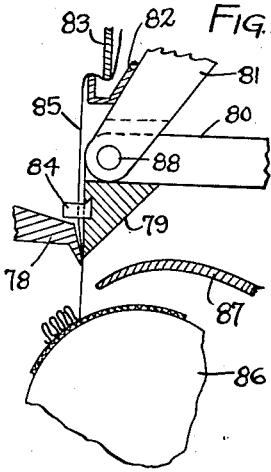
Figure 23:
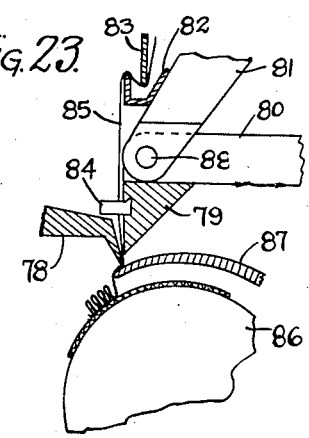
Figure 24:
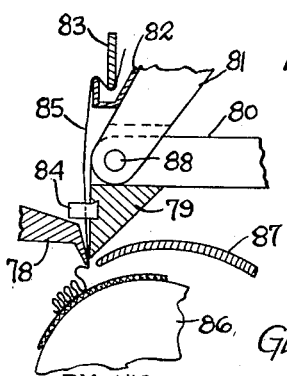
Figure 29:
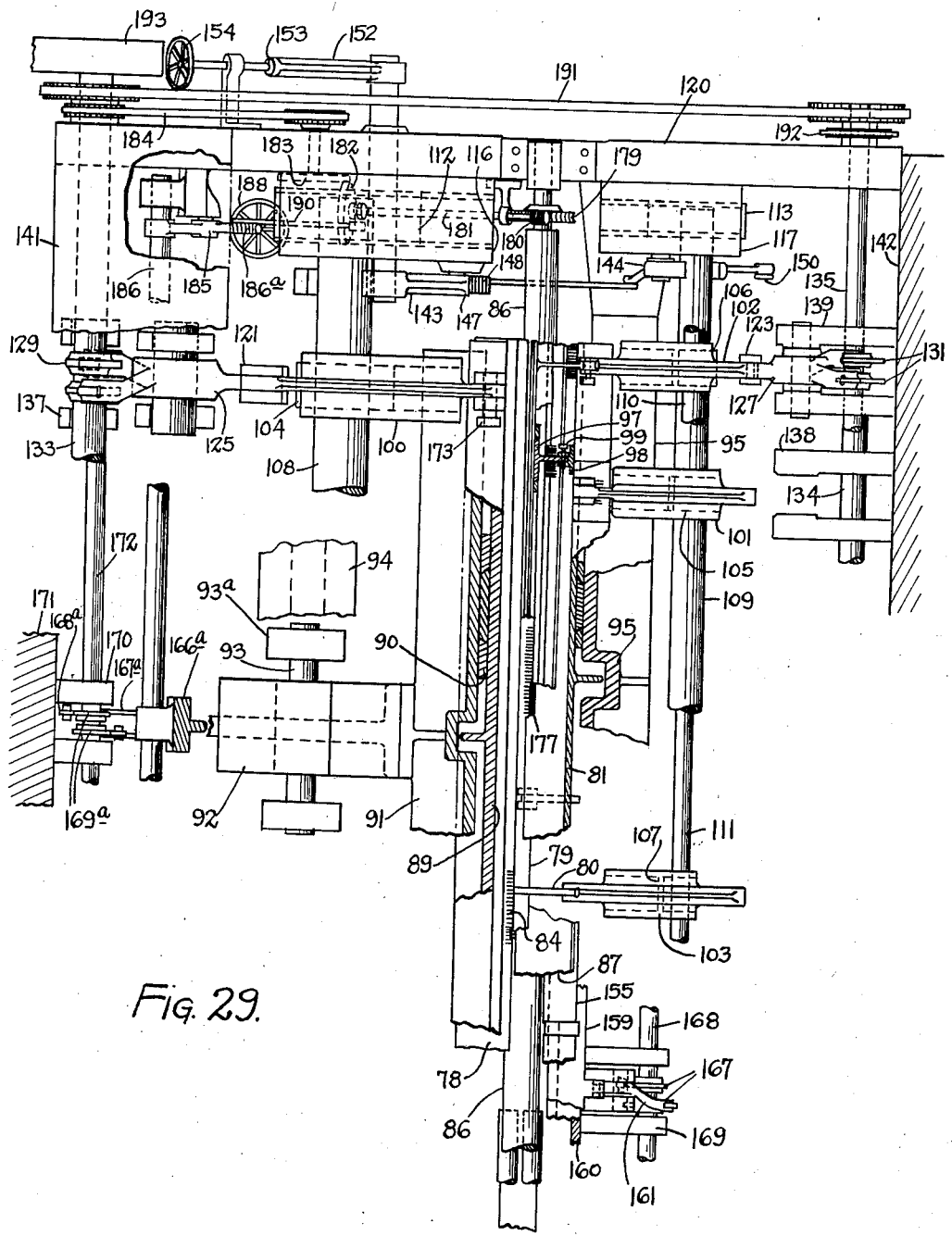
Figure 30:
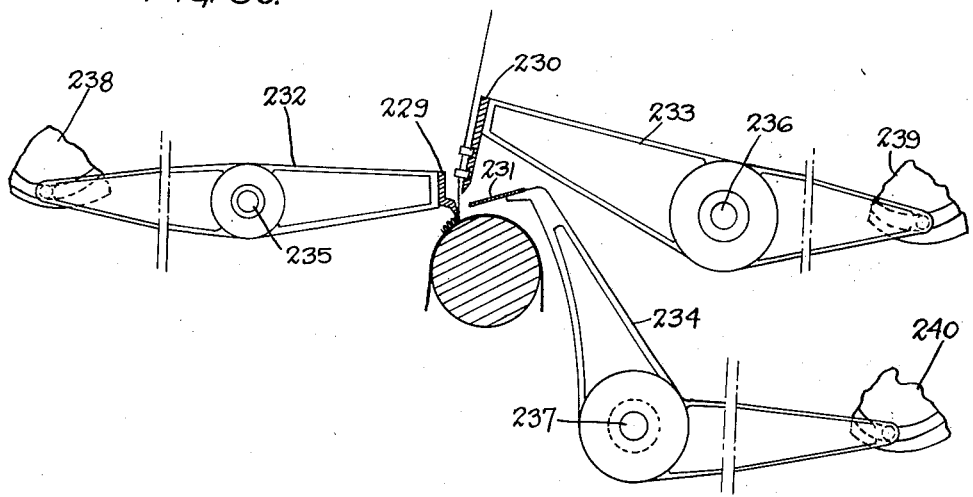
Figure 31:
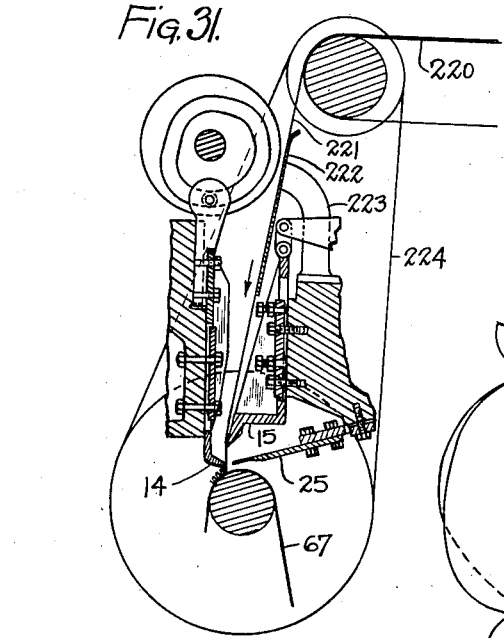

Figs. 6 to 12 inclusive show in section successive steps of the methods in the cycle of the parts of Figs. 4 and 5;

Figs. 13 to 17 inclusive show in section successive steps of another cycle using other means for producing my improved result whether using batt or separate threads;

Figs. 18 to 24 inclusive show in section successive steps of still another cycle with means of producing my improved result, used largely with separate threads;

Fig. 25 is a section on the line 25—25 on Fig. 19;

Fig. 26 is a vertical sectional view of a machine embodying the detail means in the cycle of Figs. 4 to 12;

Fig. 27 is an end elevation, with some parts broken away, of the machine shown in Fig. 26;

Fig. 28 is a sectional view of a machine embodying the detail means in the cycle of Figs. 18 to 25, as well as other features to be hereinafter described;

Fig. 29 is a partial plan view of the machine of Fig. 28;

Fig. 30 is an elemental sectional view of another modified form of mechanism for producing my improved result;

Fig. 31 is a partial sectional view of the machine of Fig. 26 but arranged for the use of batt pile material;

Figs. 32 to 34 inclusive show successive steps in a cycle of the parts as shown in Fig. 31 using batt material;

Fig. 35 is an elemental sectional view of another modified form of mechanism for producing my improved result;

Figs. 36 to 39 inclusive are further successive steps in the cycle of the mechanism of Fig. 35.

Figs. 40 and 41 are enlarged detailed sections of certain of the parts in Fig. 28 in two positions thereof;

Fig. 42 is a partial plan view on line 42—42 of Fig. 40.

Fig. 43 is a sectional view of pneumatic means for assisting in the formation of my pile loops.

Figure 45:
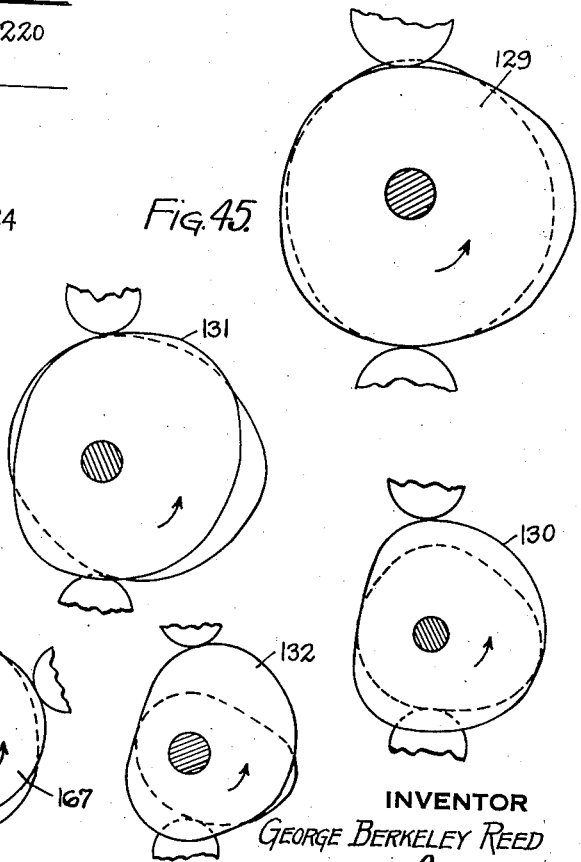

Fig. 44 is a sectional view of means to prevent the adhesive from adhering to the loop forming mechanism; and Fig. 45 is a detail view of the cams shown in Fig. 28.

Similar numerals refer to similar parts throughout the several figures.

Figs. 1 to 3 serve to illustrate the fundamental principles of my methods of affixing pile loops to a backing cloth and will now be described. A suitable backing cloth 2 is led over the anvil roller 1, the backing cloth being exteriorly coated with a suitable cement 3. This cement 3 may be any of innumerable materials such as pyroxylin, latex, vulcanizable cement, guttapercha, etc., the immediate requirement being that at the time of the affixing of the pile loops thereto a considerable portion of the cement 3 on the cloth 2 is in a tacky state.

The pile material 4 may be in the form of a continuous sheet of batt composed of natural animal, vegetable, or mineral fibres, or artificial fibres, suitably prepared, of which batt-sheet 4 may be considered in these views as a cross section; or it may consist of a row of threads, yarn etc. (Fig. 5) suitably spaced laterally across the backing cloth 2 in which case 4 then represents a single one of such threads. Pile loops 5 have been previously formed and affixed during the relatively continuous process of which the single cycle of my improved method is here shown in part. In Fig. 1 the pile material 4 is grasped or seized at the point 7 above the roller 1 a certain distance from the affixed base 6 of the last loop 5 between the hammer element 8 and the clamping element 9, said elements 8 and 9 then descending so as to cause the pile material 4 to form a fresh loop, the hammer element 8 finally driving the pile material 4 into the tacky cement 3 as shown in Fig. 2. The pile material 4 is then released by separation of the two elements 8 and 9 with respect to each other, thus leaving the newly formed loop 10 (Figs. 2 and 3) affixed in the cement. The elements 8 and 9 are then returned to grasp a fresh piece of the pile material 4 for another loop to repeat the cycle.

The longitudinal position of the backing cloth 2 is changed with respect to the down stroke position of the hammer element 8 at each repetition of the cycle, as for instance by turning the anvil roller 1 in order to position successive loops 5 longitudinally along the cloth travel; this motion may be either continuous or intermittent as will be later described.

During the further travel of the backing cloth 2 carrying the freshly affixed pile loops 5, the pile fabric thus assembled may be processed in various ways to set the cement 3 in a more permanent state, and the pile loops 5 may be either left as a loop pile fabric, or the tops of the loops sheared off in a manner well known in pile fabric manufacture.

While I will later in this specification describe the application of my invention to the manufacture of batt pile fabrics, I will now set forth specific means and cycles for the handling of pile material 4 composed of a plurality of separate, relatively continuous threads, such as are used in the more common forms of woven pile fabrics.

Fig. 4 shows a vertical sectional view somewhat similar to those of Figs. 1 to 3 of the main mechanical parts immediately employed with the forming of a pile fabric composed of threads. The anvil roller 11 carries the backing cloth 12 coated with tacky cement 13. The hammer ram 14 is of similar structure and function as the hammer element 8 in Figs. 1 to 3. The clamp ram 15 is shown in elevation in Fig. 5 with the pile threads 16. For the correct spacing of the threads 16 laterally across the cloth a spacing reed 17 is mounted, preferably quite close to the end of the clamp ram 15. A preferable construction of this reed 17 is here shown comprising small tongues of metal or other material 18 projecting outward from the face of the clamp ram 15 with shorter spacing blocks 19 therebetween, both being dovetailed into the clamp ram 15 (Fig. 4). These pieces may be kept separate, in which case for threading up the machine the reed tongues 18, threads 16 and spacing blocks 19 may be fed in successively; or the reed parts may be made integral, as by sweating the tongues 18 and blocks 19 together so that the entire reed 17 may be threaded up while removed from the clamp ram 15, and then slipped into the dovetail groove therein as a unit with the threads 16 in place. In either event the reed 17 may abut against a stop plate 20 at one end of the clamp ram, and at the other end may be held by a clip 21, as shown in Fig. 5.

In many types of pile thread mechanisms it may be necessary to maintain a certain tension upon the threads 16 at a point relatively close to the immediate formation of the loops 5, in order to maintain the correct spacing provided by the spacing reeds 17. As one form of tension device for this purpose, I show in Fig. 5 a second or tension reed 22 of similar construction to the spacing reed 17; the threads 16, however, are staggered in passing between the two reeds 17 and 22 as shown (Fig. 5), thus producing frictional drag of the threads 16 when the clamp ram 15 is moved with relation to these threads, as will be hereinafter more fully described.

Further reeds in further staggered relation may be of course provided or other forms of tension device for the same purpose. The clip 23 used to hold the tension reed 22 may be of yielding or spring character, and the adjusting screw 24 provided readily to alter the offset of the tension reed 22 whereby the amount of friction and tension on the threads is changed. In Fig. 4 the loop-starting blade 25 is shown as one of several means that may be used to cause the loops 5 to form upon the proper side of the descending rams, as will be more fully described.

Figure 6:
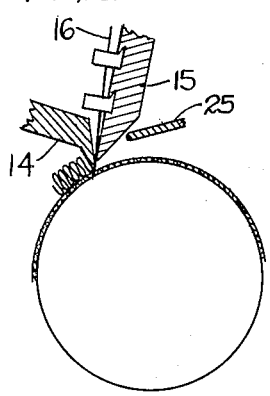
Figure 7:
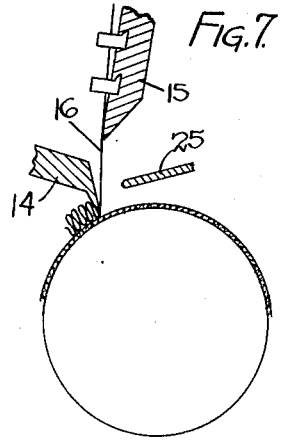

Figs. 6 to 12 show the various steps of a cycle of substantially the same parts shown in Figs. 4 and 5 using separate thread pile. In Fig. 6 the thread 16 is clamped between the clamp ram 15 and the hammer ram 14, and is being driven into the cement coating 13 of the backing cloth 12. In Fig. 7 the hammer ram 14 remains against the roller 11 and holds the thread 16 tightly in the cement 13, while the ram 15 rises; in so doing, the frictional arrangement of the reeds 17 and 22 produces a certain tension upon the threads 16, thus holding them in proper spaced relationship.

Figure 8:
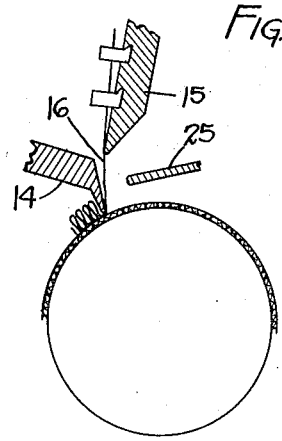
Figure 9:
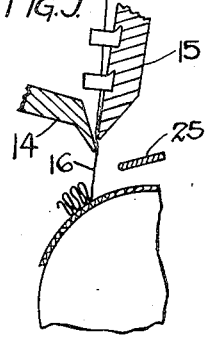
Figure 10:
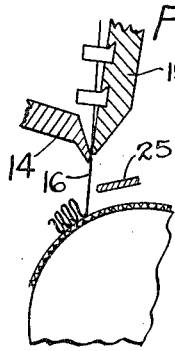
Figure 11:
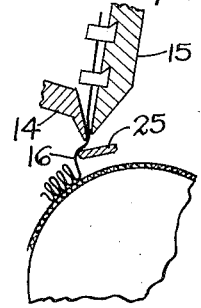
Figure 12:
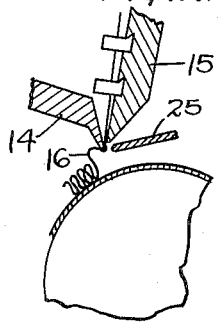
Figure 13:
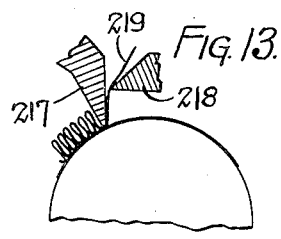

In Fig. 8, while the hammer ram 14 is still holding the threads down on the roller 11, the clamp-ram 15 is lowered slightly to relieve the tension on the threads 16. In Fig. 8, for the purpose of illustrating this effect, I have shown the threads 16 as quite slack; however in actual practice the threads 16 are preferably kept quite taut and straight with the downward motion only sufficient to relieve the greater tension of the threads, so that they will not jump out of the impermanent cement 13, if the hammer ram 14 is raised, though the threads 16 are still held in their correctly spaced character. In Fig. 9, the clamp-ram 15 remains stationary with the hammer ram 14 raised preferably to a position at which it does not quite clamp the threads against the clamp ram 15. In Fig. 10, the clamp ram 15 moves downwardly so as to clamp the threads 16 against the hammer ram 14, while the two rams 14 and 15 begin to descend together. As they do so, the loop starting blade 25 is moved against the threads 16, to bend the latter in the direction of the previously formed loops (Fig. 11). The loop 5 having thus been started in the proper direction, the blade 25 withdraws as shown in Fig. 12, while the rams continue their descent to complete and affix the new loop on the cloth 12 as in Fig. 6.

Fig. 26 shows a vertical sectional view of a suitable machine for operating according to the above cycle, and Fig. 27 is an end elevation of the same machine. The hammer ram 14 is preferably formed in an integral plate or light casting, braced by ribs 26, and is held in vertical sliding relationship to the cross beam 28 by gibs such as the beveled plates 27. The ram 14 is operated by a plurality of cam followers 29 bolted to it; the cam followers 29 are also slidably held by the plates 30 to the beam 28; and carry cam-rollers 29a.

The cam followers 29 are reciprocated by means of their cam rollers 29a travelling in a plurality of matched box cams 31 mounted upon the cam-shaft 32 journalled in bearings 31a carried by the beam 31b.

The clamp ram 15 is of somewhat similar construction to the hammer ram 14 and is gibbed by plates 33 upon the cross beam 34 and is reciprocated by links 35, rocker-arms 36 journalled in brackets 36a on the cross beam 34. The cams 37 which oscillate the rocker arms 36 are affixed to the cam-shaft 39 journalled in bearings 40 also mounted upon the cross beam 34. Upon the cam-shaft 39 are secured separate cams 38 operating bell cranks 41 journalled in brackets 41a on the beam 34 with the links 42 connected to the loop-starting ram 43 provided with the loop-starting blade 25 gibbed by the plates 44 upon the beam 34.

Beams 34 and 31b are rigidly mounted upon the main frames 45. The cross-beam 28 is hung upon the arms 46 pivoted upon the brackets 47 secured to the beam 31b, and during the operation of the machine is held in proper position by pins 48 registering with holes cut in lugs 49 on the frames 45.

The cam-shafts 32 and 39 are synchronously driven in the direction of the arrows from any suitable source of power through the gear 50, the pulley 51a, and the belt 51. The cam-shaft 32 is slidably as well as rotatively mounted in its bearings 31a, its lateral sliding motion being controlled by the hand-lever 52. By moving the lever 52 to the position shown by the dotted lines (Fig. 27), the cam rollers 29a may be freed from the cams 31, and by removing the pins 48 the entire beam 28 with ram 14 and associated devices may be swung to the position shown in the dotted lines 53 of Fig. 26 thereby providing free access to the face of the clamp ram 15 for the purpose of threading up the reeds 17 and 22, replacing broken or run out threads 16, or for any other purpose.

The main frames 45 also carry the cross beam 54 which in turn carries the main anvil bearings 55 (Fig. 27) which in turn carry the anvil roller 11. The anvil roller 11 is preferably further supported by a series of idler rolls 57 and 57a journalled in bearings 58 on the cross beam 54. The anvil roller 11 carries at one end the worm-gear 59 driven by the worm 60 on the shaft 61 which is driven by bevel gears 62 and 62a, the gear 62a being mounted on the end of the cam-shaft 39. Gear 62a is not shown on Fig. 26 because of confusion with the cam contours in this figure.

The pile threads 16 are originally supplied from any suitable source such as the spools 63 from which the threads pass to the tension reed 22 as previously shown in larger scale (Figs. 4–12), and have been described in relation to Figs. 4 to 12. Between the spools 63 and the several parts shown in Fig. 4, it is to be understood that the threads 16 may pass through various auxiliary apparatus, such as a reed 64, further tension bars, electric tell-tales and the like, as already in use on pile weaving looms, and are not shown because not forming any part of my invention. The spools 63 may be mounted on spindles set in a readily removable frame 65. While one end of the machine as shown may be blocked off by the gearing etc., the other end may be left of open construction, such as the C-shaped framing 45 as shown, and if the reeds 17 and 22 of Fig. 4 are made of one-piece construction as previously described, these reeds 17 and 22 may be threaded up and the spools 63 placed on the spool frame 65 while entirely removed from the machine. Then the entire assembly of threads, threaded reeds and spool frame and spools may be quickly slipped into the machine from the side thereby rendering it quite easy and rapid to set up a new run of material on the machine.

It will be readily understood that the parts such as the rams 14 and 15, blade 25 and anvil roller 11 in Figs. 26 and 27 correspond in structure and function to similarly numbered parts in Figs. 4 to 12. The cams 31, 37 and 38 are so timed and contoured as to produce the cycle of the respective parts to which they are connected substantially as shown in Figs. 6 to 12, or any modification required by various types of pile material or final fabric to be made. For example, the height of the pile may be changed by the substitution of cams of different stroke; the spacing of the loops 5 longitudinally along the travel of the cloth 12 may be varied by varying the ratio of the gears 62, 62a which drive the anvil roller 11; and the spacing of the threads 16 laterally across the cloth 12 may be varied by substituting different forms of reeds as 17, 22, 64 as well as the spools 63.

While, as previously described, my improved method of pile forming and affixing is operable with numerous forms of cement, I have, as one example, made successful pile fabric using for the cement a pyroxylin coating upon the backing cloth 12, this pyroxylin being wetted with a suitable solvent at a certain time interval before the cloth 12 and cement 13 arrive at the point of loop affixing, so that such cement is at that time in a tacky condition for receiving the pile loops.

Fig. 26 shows diagrammatically the details of further mechanism for supplying the cloth 12 and its preparation with cement 13 for delivery of assembled pile fabric. I will first describe the same when using the pyroxylin cementing method. The pyroxylin coated cloth 12 is drawn from any source, such as the mill roll 66 at a considerable distance from the anvil roller 11. The anvil roller 11 is preferably surfaced with an abrasive, or minute teeth, so as to obtain sufficient traction on the cloth 12.

In order to obtain the desired tension upon the cloth 12 for traction thereof by the anvil roller 11, such cloth is preferably passed through a suitable tension device, for example, the rolls 68 and 69 which are rotated at considerable speed in an opposite direction to the travel of the cloth 12. These rolls also carry smoothing or spreading grooving on their surfaces, or any similar means for smoothing and stretching the cloth 12 as well understood in the art of cloth winding or finishing.

The rotating brush 70 is partially immersed in a bath of suitable solvent 71 and acts to apply the solvent to the pyroxylin coating 13 of the cloth 12, this solvent application being arranged at the proper distance from the anvil roller 11 with relation to the speed of cloth travel, so that the pyroxylin reaches the point of loop affixing in the proper tacky condition. The rolls 68, 69 and 70 may be geared together as indicated (Fig. 26) and are driven by any means such as the pulley 72, belt 73 from the motor 74.

After the cloth 12 passes over the anvil roller 11 and receives the pile loops 5, it will be readily understood that tension is required to complete the traction effect upon the anvil roller 11. While the pile loops 5 are held fairly stable in the tacky pyroxylin, it is preferable that such loops 5 be not subjected immediately to any great pressure as by passing through traction rolls, or tight winding upon a receiving roll, until the cement 13 has set in a more permanent state.

The cloth 12 with affixed pile loops 5 is therefore preferably passed through a drying chamber 75 of suitable length, which may be supplied with an air blast by any means such as the blower 76, such air being preferably heated for the more rapid carrying off of the solvent. The pyroxylin is thus rendered of a relatively permanent nature and grips the pile threads 16 tightly. The assembled pile fabric may be wound quite tightly upon any form of power driven winding device as diagrammatically represented by the winding roll 77, thus producing the necessary tension of the cloth for traction upon the anvil roller 11 as previously described.

It is to be understood that innumerable different arrangements of cloth supply, processing and collecting of more or less finished fabric may be used, but the foregoing is shown and described only as a definitely workable method.

In case pyroxylin is used as the cement, instead of supplying the cloth coated with fixed pyroxylin which is then partially dissolved by a solvent, the bare cloth 12 may be supplied with dissolved pyroxylin, or any other form of reasonably quick drying cement may be applied at a suitable time interval previous to the loop affixing, by means similar to the rotating brush 70, or calender rolls, etc., provided only that the necessary tacky condition is obtained when affixing the pile loops 5 to the cloth 12. If a vulcanizable cement or latex etc. is used, the chamber 75 may be considered as representing some form of curing or vulcanizing apparatus for either partial or complete set-up of the cement. I have also used guttapercha experimentally as a cementing medium, in which case the brush roller 70 is replaced by a heating mechanism in order to apply and soften the guttapercha; then the chamber 75 serves as a cooling chamber.

The pile fabric thus formed as by the above process is of course a loop-pile fabric, such as bombazine, Wilton carpet, etc. By shearing off the loop ends, either as part of the continuous process here described, or in a separate operation, a tuft pile fabric is produced; such shearing is well understood in the art of woven pile fabrics, and forms no part of this invention.

Figs. 18 to 24 illustrate the successive steps of a somewhat different cycle in my improved methods and utilizes a modified apparatus for the clamping and also a modified form of tension device. In Figs. 18 to 24 the hammer blade 78 corresponds in general to previously described and illustrated hammer elements or rams. A clamp jaw 79 is pivoted upon the clamp-ram 81 at the channel 88 and is shown as oscillatable by the arm 80 integrally affixed thereto. The clamp jaw 79 carries a spacing reed 84 similar to the reed 17 of Figs. 4 to 12. As a tension device the channel 82 is mounted on the clamp-ram 81, and the tension blade 83 is actuated in relation to this channel 82 to produce a varying friction on the thread 85 as will be readily understood. Fig. 25 shows an end elevation of the parts associated with the clamp-ram 81.

Figure 18:
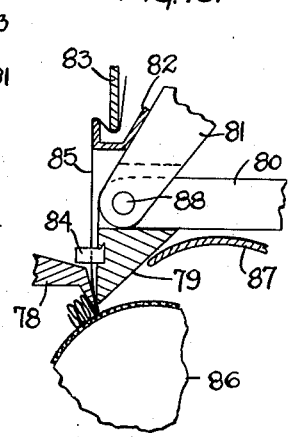

Referring now to Fig. 18, the parts are here shown with the hammer blade 78 driving the threads 85 into the cement coating 13 of the cloth 12 carried upon the anvil roller 86 substantially in the same way as previously described. The clamp jaw 79 is then swung away from the hammer blade 78 to release the threads 85 and the entire clamp ram 81 with associated parts is raised as shown in Fig. 19. Simultaneously the tension blade 83 is raised at the same rate so as to maintain the same relative position to the channel 82, thereby producing a desirable friction and tension on the threads 85 similar to that previously described using staggered reeds 17 and 22.

However, for the same height of pile loops, the clamp ram 81 is not raised to an over-travel, as in the cycle of Figs. 6 to 12, but is stopped in its upward travel at a somewhat lower position, but the tension blade 83, however, continues its upward travel somewhat further (Fig. 20), so as to immediately relieve the tension on the threads 85. The hammer blade 78 is then raised (Fig. 21) to a height substantially that required for a given height of pile as the hammer 14 shown in Fig. 9. The clamp jaw 79, however, is still swung out as shown to clear the thread; then the clamp jaw 79 is swung inwardly to clamp the thread 85 with a direct gripping motion as contrasted with the downward rubbing effect upon the threads produced by the downward motion of the clamp ram 15 in Figs. 9 and 10.

Two novel effects are at once apparent beyond the apparatus and cycle of Figs. 4 to 12. One is that, due to the combined effect of the separately actuated tension device, and the clamping by means of the swinging jaw 79, the clamp ram 81 is raised to a much less height for a given height of pile loop, and the two successive dropping steps of Figs. 8 and 10 are obviated. This method speeds up the possible cycle in the light of acceleration and vibration of the mechanism. The other novel effect is that in certain forms of pile material, the direct lateral clamping by the swinging jaw 79 will produce more accurate length of pile loops than the rubbing effect in the clamping of the previous method. In the further steps of the cycle (Figs. 22 to 24), the action of the loop starting blade 87 is substantially similar to the blade 25 previously described, with the tension blade 83 returning at any time after the threads 85 are clamped to the position relative to the channel 82 as shown in Fig. 18.

It is to be understood that the tension device 82 and 83 may be multiple bladed with various modifications introduced therein, all within the scope of the general principle of tension and tension relief as has been described.

Figs. 28 and 29 show a sectional view and a fragmentary plan view respectively of a preferred form of machine in which the detail steps in the cycle of Figs. 18 to 25 may be practiced. These Figs. 28 and 29 also illustrate several additional features of construction and operation to be described.

Figs. 28 and 29 are to be understood as more or less diagrammatic in character and do not show an actual machine design. The immediate loop forming and affixing parts correspond to similarly numbered parts of Figs. 18 to 25. The hammer blade 78 is detachably secured to the hammer ram 89, gibbed at 90 to the cross beam 91 which is carried by the arms 92 pivoted at 93 to the blocks 93a fastened to the fixed beam 94. The clamp ram 81 is similarly gibbed upon the fixed beam 95. The tension blade 83 is carried by the tension ram 96 slidably gibbed upon the brackets 97, which brackets 97 are removably held in the tongues 98 by the pins 99; the tongues 98 are mounted upon the clamp ram 81. The hammer ram 89, the clamp ram 81, and the tension ram 96 are reciprocated and the clamp jaw arms 80 are oscillated by rocker arms 100, 101, 102 and 103 respectively. These rocker arms are slidably gibbed upon blocks 104, 105, 106 and 107 respectively which are rotatively hung upon their respective shafts 108, 109, 110 and 111. These shafts 108, 109, 110 and 111 are carried upon slidable blocks 112, 113, 114 and 115 respectively carried in their respective gibs 116, 117, 118 and 119 carried by the main sideframes 120.

The rocker arms 100, 101, 102 and 103 are oscillated by their respective links 121, 122, 123 and 124, rocker arms 125, 126, 127 and 128, and complementary cams 129, 130, 131 and 132 (Fig. 45) affixed to their respective cam-shafts 133, 134, 135 and 136 journalled in their respective bearings 137, 138, 139 and 140, which also form bearings for the rocker arms 125, 126, 127 and 128 respectively. The bearings 137 are mounted upon the cross beam 141 and the bearings 138, 139 and 140 are carried upon a wall 142 both rigid with main frames 120. The mechanism in Fig. 28 is shown stopped in a position in the cycle as of Fig. 19 at which time the hammer blade 78 and ram 89 are at their bottom stroke, and the other rams and arms 80 are at top stroke. The pins and pivot shafts 108, 109, 110 and 111 of their respective rocker arms 100, 101, 102 and 103 are arranged horizontally when at bottom stroke as shown in the position of rocker arm 100 and these four pivot shafts 108, 109, 110 and 111 may be slidably shifted in the same horizontal line.

It will thus be readily understood that by shifting these pivot shafts upon their supporting gibs 116, 117, 118 and 119, the leverage, and consequently the stroke of the respective rams will be altered, yet without changing their position at bottom stroke. The pivot shafts 108, 109, 110 and 111 may be shifted by their respective jaw arms 143, 144, 145 and 146, which are interconnected by gear sectors 147 and 148 and linkage 149, 150 and 151, and are simultaneously adjustable by means of the worm gear sector 152, the worm 153 and the handwheel 154. By adjustment of the hand-wheel 154, the stroke of the different rams and therefore the height of the pile loops produced may be readily changed.

A somewhat different construction and method of operation are illustrated for altering the action of the loop-starting blade 87, an enlarged view of which is shown in Figs. 40, 41 and 42. The blade 87 is fastened upon the ram blocks 155 which are carried by the eccentrics 156 upon the shafts 157, which latter are mounted in the bearing 158 upon the ram 159. The ram 159 is gibbed upon the fixed beam 160 and is reciprocated at a fixed stroke by the rocker arms 161 actuated by complementary cams 167 secured upon the cam-shaft 168 journalled in the bearings 169 upon the beam 160. The eccentric shafts 157 are linked together by the cranks 163 and the links 164, and may be simultaneously rotated through a certain arc by the lever 165 at each end of the machine, the lever 165 being connected by the link 166 to an integral wing of the jaw arm 146.

In Fig. 40 the mechanism is shown as used in the making of a relatively high pile fabric, the ram 159 and with it the loop-starting blade 87 being actuated by proper contouring and timing of the cams 167 to cause the bending of the pile threads 85 at the proper time in the cycle, as has been previously described. By turning the handwheel 154 (Fig. 28) to alter the stroke of the other rams and thereby change the height of the pile, by the action of the linkage 166, 165, 163, as well as the eccentrics 156, the parts are made to assume a different position, such as in the low-pile position of Fig. 41, when the blade 87, while still having the same stroke, is retracted and depressed in conjunction with the reduced action of the other rams.

It will be noted from a comparison of cycles in the methods hereinbefore described that the hammer element such as 14 of Figs. 4 to 12, or 78 of Figs. 18 to 25, remains in a down-stroke position during a portion of the cycle to hold the threads tightly in the still impermanent cement, while the reeds and tension device are being retracted.

It is desirable that during this period the hammer element should remain relatively immovable with respect to the backing cloth 12. With this in view the anvil roller 11 or other means used to feed the backing cloth 12 through the machine may be driven intermittently, for example, by a Geneva motion or the like, so that the cloth 12 is moved to a new position only while the hammer means is raised. However, while I do not limit myself against an intermittent drive of the backing cloth, at the very high frequencies which will be employed for commercially economical production of pile fabrics according to my methods, an intermittent drive, by reason of the inertia lag of the anvil roller 11 and associated mechanism, is less attractive than a continuous cloth feed; hence in the machines of Figs. 26 and 27 and Figs. 28 and 29 I show a continuous cloth feed.

In the machine of Figs. 26 and 27 the relative movement of the cloth 12 with relation to the downwardly dwelling hammer ram 14 is to be understood as being compensated through a slight springing of the relatively thin lower end of the hammer ram 14. In moderately spaced pile fabrics, for example, those with pile loops pitched $\frac{1}{16}$ inch apart, with the downward dwell of the hammer ram 14 requiring approximately $\frac{1}{3}$ of the total cycle, the relative motion of the cloth 12 would be $\frac{1}{3} \times \frac{1}{16}$ inch or 1/48 inch, which is easily compensated by said springing action of the hammer ram 14, or may be, in fact, ignored.

In Figs. 28 and 29 another means of compensation for the above objects is shown. Here the beam 91, upon which the hammer ram 89 is gibbed, is hung upon arms 92 similarly pivoted to those of the machine of Figs. 26 and 27.

This beam 91, however, is slightly oscillated to cause the hammer blade 78 to follow the continuous travel of the cloth 12 during the downward dwell of said blade 78, this blade 78 being actuated through rocker arms 166a, the links 167a, and the rocker arms 168a oscillated by suitably contoured and timed complementary cams 169a upon cam-shaft 172, the rocker arms 168a and cam-shaft 172 being journalled in the blocks 170 mounted upon the fixed beam 171.

With a view to accessibility for threading up the machine as previously described for the machine of Figs. 26 and 27, the pins 173 which connect the clamp ram 89 to the rocker arm 100, and the pins 174 connecting the beam arms 92 to the rocker arms 166a are made readily removable, whereby the entire clamp ram 89 and associated parts may be swung backward to the position shown in the dotted lines. Further accessibility in this machine is provided by making easily removable the pins 175 which connect the tension ram 96 with rocker arms 102, whereby the tension ram 96 and with it the tension blade 83 may be readily raised for access to the threads 85.

Furthermore by removing the pins 99 the gib brackets 97 may be removed, whereby the assembled reeds and threads and associated parts may be carried sideways into the machine when starting a run, as already described for the machine of Figs. 26 and 27. It is to be understood that the gib brackets 97 and the upper webs of the tension ram 96 are of relatively thin section, and are preferably arranged in vertical alinement with one another, with the threads 85 coming downward from the supply and dividing around these brackets and webs, the threads being brought into substantially correct spacing for their passage through the tension device by the reed 177 carried by the channel 177a on the clamp-ram 81.

The lateral thread spacing may be desirably varied through substitution of different reeds and I have already set forth how the ready adjustment of pile height may be obtained as by the handwheel 154.

For the ready adjustment of longitudinal loop pitch the anvil roller 86 may be driven by the worm gear 179, the worm 180, the shaft 181 and any form of variable ratio mechanism such as the friction discs 182 and 183, the latter being driven by the chain 184 from the cam-shaft 172. The rocker arms 166a are of adjustable stroke as described for the rocker arms 100, 101, 102 and 103 of the other motions of the machine, and are so designed that the hammer blade 98 is always returned to substantially the same position for thread clamping and the initial driving of the threads into the cement, but the longitudinal walking of the hammer in order to follow the cloth movement to be of variable length.

The jaw arm 185 serves to shift the fulcrum shaft 186 thereby altering this longitudinal walking effect, and this arm 185 is adjusted by the worm sector thereon 186a, the worm 187 and the handwheel 188, and is further connected by the links 189 to the bell crank 190 which serves to alter the ratio of the friction discs 182, 183, as desired. The parts are herein shown as adjusted for a relatively long stroke; by turning the handwheel 188 the walking of the hammer ram is reduced, and at the same time the speed of the cloth feed is reduced with relation to the frequency of the ram cycles—the whole contributing to a smaller longitudinal pitch of the pile loops along the cloth travel.

The several cam-shafts 133, 134, 136, 168 and 172 are synchronously driven by any suitable means such as the chain 191, and the cam-shaft 135 is shown as further synchronously driven by the short chain 192, power for both chains 191 and 192 being received from any suitable source such as the pulley 193 and belt 194.

It is to be understood that in this machine the construction of the support of the anvil roller, as well as any mechanism for delivering the cloth and carrying away the assembled pile fabric, also the thread source, etc., in this machine of Figs. 28 and 29 may be in general similar to that of the machine of Figs. 26 and 27.

In the foregoing cycles of Figs. 6 to 12 and Figs. 18 to 22 it is obvious that the threads are first clamped at a point considerably remote from the last affixed pile loop base and are then bent by a loop-starting blade, while at the same time the threads are slackened for such bending by simultaneous descent of the respective rams.

In order not to be limited to this particular succession of events in these cycles, I will describe in referring to Figs. 35 to 39 a distinctly different form of mechanism and cycle in which the thread bending means is placed in what will be its effective position before the clamping takes place. Fig. 35 shows the mechanism in outline only sufficient to indicate the method of operation. The hammer ram 195 is reciprocated by the cam 196 and is gibbed to the beam 197 which is pivoted at 198 and is oscillated by the cam 199, all these parts being somewhat similar to those in the mechanism of Figs. 28 and 29. The clamp ram 200 and tension ram 201 are also roughly similar to those in Figs. 28 and 29 and are reciprocated by the cams 202 and 203 respectively, but these rams 200 and 201 travel in a path relatively oblique to the approximately vertical reciprocating path of the ram 195. A loop-starting blade 204 is here shown as hung upon a plurality of arms 205 which pass through openings 206 in the clamp ram 200 and are pivoted upon the latter at 207; the blade 204 is oscillated relative to the ram 200 by the links 208 pinned to the fixed bracket 209 in conjunction with the reciprocation of the ram 200.

This loop-starting blade mechanism 204, 205 etc., requires no cams although the blade 204 may be equally well operated by mechanism similar to that of the previous machine (Figs. 28 and 29). The first position of the cycle is shown in Fig. 35. The ram 200 is then raised in its oblique path upwardly and away from the ram 195 and in doing so the linkage 208 causes the loop-starting blade 204 to be swung inwardly as shown in Fig. 36 to a position where its leading edge is somewhat beyond the bottom point of the ram 200. The tension ram 201 continues to rise (Fig. 37), as described and illustrated in Fig. 20 to relieve the tension of the threads 210. In the meantime the point of the clamp ram 195 has walked slightly to follow the travel of the cloth, as previously described for Fig. 28. Such ram 195 now rises, and through combined action of the cams 196 and 199 (Fig. 35) is made to describe a more or less elliptical path as shown by arrows in Fig. 38 and clears the blade 204 in rising; when above the blade 204 and moving toward ram 200 it finally clamps the threads 210 against the ram 200 preferably with a slight downward movement. The two rams 200 and 195 then descend along the oblique path of the former while the blade 204 at the same time swings outwardly (Fig. 39), after which the cycle is repeated.

In the foregoing mechanisms and cycles of Figs. 4 to 12, 18 to 25 and 35 to 39, I have shown a loop-starting means in concrete form, for example, the blades 25, 87 and 204 respectively. In Fig. 43 pneumatic means are used for producing the similar result in bending the threads in the direction of the previously formed loops during the descent of the rams.

On one side of the mechanism (Fig. 43) the linear nozzle 211 formed of two plates with gaskets 212 at the back and ends and spacing blocks 213 is supplied with compressed air through any convenient means such as the pipe 214, and an air blast is used either blowing continuously or else intermittently at the most suitable time of the cycle as controlled by any suitable means such as the timed rotary valve 215. The action will be readily understood from the drawings. As the converse of this I also show upon Fig. 43 a largely similar suction nozzle 216 which may be used either alone or in conjunction with the pressure nozzle 211, the action of either or both of these methods causing the thread loops to form in the proper direction as will be obvious.

Figure 14:
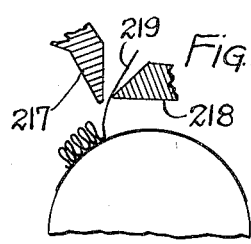
Figure 15:
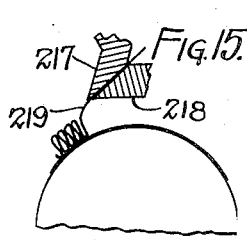
Figure 16:
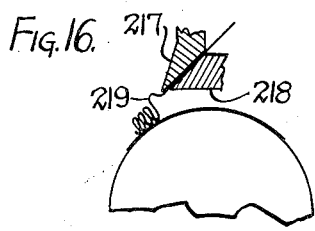
Figure 17:
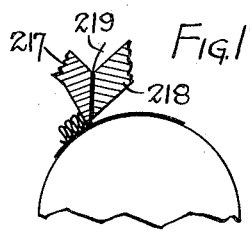

In Figs. 13 to 17 I show in outline a still different modified method of causing the loops to form in the proper direction, in this cycle using neither separate tangible means nor pneumatic means. Starting with the hammer element 217 in the usual downward position, and omitting thread tension relief means (which may be in general much like those previously described), the clamp element 218 is raised to the position shown in Fig. 13, its working surfaces having a somewhat different angular direction from those of the clamp rams previously described and illustrated. The hammer element 217 then rises as shown in Fig. 14, and then swings over to clamp the threads 219 against the slanting face of the clamp element 218 as shown in Fig. 15, thus inducing a bending of the threads 219 in the proper direction. When the two rams are lowered (Fig. 16), while still clamping the threads obliquely, the loop is thus started in the proper direction, without the use of extraneous loop-starting means, the rams 217 and 218 being preferably returned to the vertical clamping position shown in Fig. 17 before the threads 219 are finally affixed in the cement.

In all of the foregoing drawings and descriptions relating thereto, with the exception of the fundamental cycle of Figs. 1 to 3, I have described in detail and also shown workable means for utilizing a plurality of separate threads as the pile material, both because the technique of handling and properly spacing and affixing such individual threads appears more difficult than the forming of pile loops from a single sheet of batt, and because pile fabrics of regularly spaced thread tufts or loops, similar to the usual woven pile fabric, is, for the present at least, by far more desirable from the standpoint of popularity, than pile fabrics of more irregularly arranged fibres in a batt.

However my invention is equally applicable to the use of a batt, as the pile material, and in Fig. 31 I show the essential parts for such use, and in Figs. 32 to 34 I show a cycle illustrating the methods used. Fig. 31 is a fragmentary sectional view of the more central parts of the machine of Fig. 26 but arranged for batt-sheets. The hammer ram 14, the clamp ram 15 and the loop-starting blade 25, or any other loop-starting means are used as heretofore described. The reeds, tension means and spool frame of Fig. 26 are, however, omitted, and instead the conveyor 220 is used to feed the sheet of batt 221, fitted preferably with the support pan or chute 222 for the batt, this pan or chute being supported by the brackets 223. The conveyor 220 is driven by any suitable means, such as the belt 224, at a suitable speed in relation to the cloth feed, the batt 221 being, of course, supplied at a much higher rate than the backing cloth 67.

Referring to Fig. 32 the batt sheet 221 is clamped by rams 14 and 15 and is driven by the former into the tacky cement coating of the backing cloth 67 in the manner as previously described in the use of separate pile threads.

The clamp ram 15 then starts to rise thereby releasing the batt 221 insofar as clamping by the clamp ram 15 against the hammer ram 14 is concerned. However, distinctly different requirements and conditions are immediately obvious in order to obtain the results when compared with those when using separate pile threads. The batt 221 has been previously prepared by carding so that the fibres are in so far as possible arranged in proper position for their ultimate use as pile columns, and any further attempt at spacing, tension etc., as used with separate pile threads is usually both unnecessary and impossible. When the clamp ram 15 starts to rise (Fig. 33) the conveyor 220 is already furnishing a surplus of batt sheet for the next pile loop, the batt sheet 221 being either actually slack, or at least under no appreciable tension. There is, therefore, no necessity that the hammer ram 14 should dwell in a downward position, as I have shown in previous cycles when using separate threads, since the relatively slack pile will have no tendency to jump out of the impermanent cement if the hammer ram 14 is raised.

The hammer ram may therefore be raised immediately by suitable variation of cam contours, timing, etc., after the clamp ram 15 has begun to rise, thereby speeding up the cycle considerably over those cycles shown for separate threads; the further operation in this cycle (Fig. 34) is substantially similar to that for separate threads. It is to be distinctly understood that while I have described the above cycle (in which the hammer ram has only an instantaneous dwell in the downward position) with relation to the use of batt-sheet 221, and have indicated a considerable downward dwell of the hammer ram 14, 78, 195 etc. in my previously described and illustrated separate thread mechanism and cycles, I do not wish to limit myself to this considerable downward dwell in the use of separate threads.

If threads of such character are used, together with suitable reeds and other modifications, whereby a relatively light tension or upward drag is produced on the threads during the rising of the clamp ram, while still maintaining acceptable lateral spacing of said threads, and if powerful enough cement in the tacky state is obtained to resist said upward drag, the last described and illustrated cycle of Figs. 32 to 34 with immediately rising hammer ram may be used with separate threads as well as with batt-sheets. In addition to a simplification and speeding up of the cycle resulting from this last possibility, it is evident that it is unnecessary in such a case to provide any means, such as the mechanism 166a, 167a, 168a, 169a, 172a of Fig. 28 for walking the hammer point to follow the cloth travel during a downward dwell of the former.

Referring to Fig. 44 I have shown another novel feature of my invention. In all the foregoing figures showing enlarged views of the ram points and cycles thereof, the lower point of the clamp rams are so arranged with relation to the lower points of the hammer rams that the clamp rams are kept clear of the tacky cement. Similarly the loop-starting blades and the pneumatic nozzles of Fig. 43 are arranged to keep clear of the cement. In regard to the hammer points, where a batt-sheet is used as a pile material, it is evident that the latter acts effectively to protect the hammer point from the cement. In the case of separate thread pile, however, the threads only partially prevent contact of the hammer point with the cement, and certain cements have a tendency to adhere to the hammer point.

This I prevent in several ways of which two are illustrated in Fig. 44 which shows in elementary form a compressed air nozzle 225 and another nozzle 225a supplying a solvent of the particular cement which is being used, the two contributing to produce a spray in a well-known manner. This spray of solvent is arranged to strike the surface of the tacky cement 13 at a point relatively close to the point of pile loop affixing, or at a time period so short before the pile is affixed that the solvent does not act appreciably upon the already tacky cement, but lies rather as a film thereon. This film serves to wet and thus protect the hammer point 14 from adhesion thereto of the cement.

As another means of accomplishing this result, I also show in Fig. 44 a bath or shower of solvent 228 impinging directly upon the hammer point 14 by means of the pipe nozzle 226 or the nozzle 227 or both that are carried by the hammer point 14. Other detailed methods all within the general scope of my method of furnishing a coating of protecting solvent for the hammer point 14 may be used, or for any other mechanical parts exposed to the cement.

Still another novel feature of my invention may be set forth. In all of the foregoing figures it will be noted that a relatively small anvil roller as 1, 11, etc. is shown and that the line of downward approach thereto of the different hammer elements is not upon the center line of the roller but distinctly offset therefrom, with the pile loops affixed upon a sloping curvature of the backing cloth 12. This is more particularly shown in Figs. 1 to 3. It will be seen (Figs. 1–3) that, through the offset approach and the suitable shaping of the hammer element 8, the pile loops 5 are affixed to the backing cloth 12 so as to lie substantially upon produced radii of the roller 1, and that by reason of the relatively small diameter of this roller the loops 5 will be more closely juxtaposed at their bases than tops.

In the case of loops packed closely together along the cloth travel, this outward flare of the loop ends reduces the possibility of the tops of previously affixed loops crowding the tops of later affixed loops backward toward the line of downward approach of the hammer point 8. Furthermore the hammer point by reason of the arrangement of offset from the center line of the roller 11 as shown (Fig. 1) carries the newly forming loop 5 downwardly with a partially sideways component with relation to the last previously affixed loop.

From the above two features the loops 5 may be formed with an extremely small pitch spacing without danger of the newly forming loop or the ram fouling the last previously affixed loop. Using this principle I have made successful pile fabric with 32 loops (or 64 tufts) of thread to the inch, the thread being 1/64 inch in thickness, or in other words a substantially solid mass of pile, if the completed fabric is laid flat.

On the other hand, while this feature of my invention is of great value in the making of pile fabric of very close longitudinal pitch, it is to be distinctly understood that I do not limit my mechanism to the offset ram approach or the relatively small anvil roller 1 or 11 etc. above noted, and for the production of many types of pile fabric may use a considerably different shaping, size, and relation of the hammer, clamp and anvil elements to those shown.

It is furthermore to be understood that while I have desired to produce a pile which is normal to the surface of the backing cloth 12, I may, for the production of certain forms of pile fabrics in which the pile has a "lay" or oblique angle to the backing cloth, further modify the mechanical parts of my machine immediately concerned with the shaping of the pile loops in any way necessary for this result.

In the machines of Figs. 26 and 27 and Figs. 28 and 29 I have shown the hammer and clamp rams as having substantially rectilinear or reciprocating motions. In Fig. 30 I show, in diagrammatic form, the hammer 229, the clamping ram 230 and loop-starting blade 231 having curvilinear motions, these parts being built of relatively light section and carried upon their respective rocker arms 232, 233 and 234 and oscillated upon their pivots 235, 236 and 237 respectively by any means such as the cams 238, 239 and 240 respectively. It will be seen that this curvilinear motion produces some discrepancy of the ram points with relation to clamping due to the rise of arc of the respective rams, which, however, may be compensated by springing of the ram blades or by the introduction of modifying motions such as cam actuated eccentrics at the fulcrums of the rocker arms 232, 233 and 234.

In the foregoing description I have grouped the principal novel features and modifications of my invention in a limited number of drawings, inasmuch as a great number of drawings would be required to illustrate all the possible combinations and modifications which may ultimately be used. In the following I mention a few of the combinations and modifications which I conceive for the production of various types of cemented pile fabrics, with the understanding, however, that machines and processes are not limited to the combinations and modifications noted.

The specific mechanisms and combinations of cycles in the two complete machines which I have shown are not necessarily a part of each form of machine. For instance the hinged jaw mechanism and/or the tension relief ram of Fig. 28 may be used with the machine of Fig. 26, and the further detailed mechanisms and modified forms of cycle in other drawings may be used with either machine or any modification thereof.

If cams are used as the actuating means for the different rams, these may be of any of several forms, double-acting complementary cams, box or groove cams, or cams single-acting against spring loaded return. Motions other than cams may be also used with certain of the cycles shown for some or all of the rams, such as crank or eccentric motions either simple or through toggle or other modifying linkage, also hydraulic motions; and as an example of a driving means different from those shown I contemplate a machine with extremely light rams electro-magnetically actuated for the production at very high speeds of the more minute pile fabrics such as velvets and velours. If an adjustable ram stroke is used, as outlined in Fig. 28, this may be of any of innumerable types of motion, well known to machine designers, and further individual adjustments of ram stroke may be supplied either manual or automatic to compensate both for wear of the parts and variations of cloth and pile thickness, and also for variations of stroke at different speeds, due to inertia and momentum of the parts. Similarly the methods of synchronized driving of the various motions such as gears, chains, etc., are innumerable, and mechanism for varying the interrelated timing of the parts at various speeds may be introduced to compensate for momentum and inertia therein.

Any method of handling batt sheets may be incorporated in any of the machines or cycles shown for separate thread pile and is in no sense limited to the fundamental cycle shown in Figs. 31 to 34. If separate threads are used, the method of spacing them laterally across the cloth is not limited to the particular form or location of reeds shown. Closed or birds-eye reeds may be used instead of the open form shown and these need not necessarily be carried upon the clamping member but may be carried by the hammer element or a relatively fixed structure, and the hammer element may have grooves or notches at or near its pointed edge for the further maintaining of correct thread spacing. As an example of a modification in this respect, I have built a successful experimental machine, in which the threads are led through a row of properly spaced holes directly through the clamp jaw and close to the lower point thereof and, while this construction produces excellent spacing of the threads, I believe that the reed construction shown in the drawings affords better accessibility and convenience in threading. It is also to be understood that if removable reeds are provided, they may be affixed by means other than the dovetails shown in the drawings, so that they may be inserted in the machine in other ways than by sliding them in sideways. It is to be further understood, both in relation to batt-sheets or separate threads, that the methods of feeding in the batt-sheets or thread are not limited to those shown in the drawings, since secondary clamping motions for feeding or tensioning the pile material may be used.

The particular method of carrying in the backing cloth for affixing the pile loops thereto, as shown, by means of a rotating anvil roller is not the only one that can be used. Instead of a rotating anvil roller, a relatively flat conveyor may be used, or the anvil may be of fixed character, and the cloth carried over it by some such means as tentering frames. Finally, the anvil need not be stationary in a vertical sense, but may itself rise to carry the cloth upward to an awaiting clamped pile, or a narrow hammer may strike the cloth from beneath, carrying only a small bight thereof upward to the pile, such a procedure constituting only a reversal of the fundamental cycle of Figs. 1 to 3.

It is also to be understood that instead of the backing cloth carrying the cement, the latter may be carried by the pile material, or that neither cloth nor pile shall carry the cement, the latter being carried into the point of pile affixture as a separate sheet.

The method of starting the pile loops forming on the proper side of the descending rams is not limited to any one of the three methods shown, to wit, the tangible loop-starting blade, the air blast or suction, or the oblique clamping shown in Figs 13 to 17, it being understood that in certain forms of pile all three methods may be more or less employed with the air blast being incorporated in the loop starting blade. As an example of a further combination, the solvent spraying means shown in Fig. 44 for protecting the hammer from the adhesive, may, if used, be incorporated in either the air blast of Fig. 43 or the loop-starting blade, if used, or even in the clamp ram.

It is to be understood that terms such as vertical, horizontal, upward, downward, etc., are to be taken only in the sense of the particular orientation shown in my drawings.

In the appended claims the term "pile material" is used as a generic term to include threads, yarns or other fibrous substances or filaments as well as continuous sheets of batt composed of suitably prepared fibres in texture formation.

I claim as my invention:

1. The method of making pile fabrics from pile material which comprises clamping spaced-apart portions of said material and then looping and affixing same to a moving backing cloth.

2. The method of making pile fabrics from pile material which comprises clamping spaced-apart portions of said material, then looping the clamped portion, and affixing the loop base formed to a backing cloth.

3. The method of making pile fabrics from pile material which comprises clamping spaced-apart portions of said material, then looping the material adjacent the clamped portion, and affixing the loop base formed to a backing cloth carrying an adhesive.

4. The method of making pile fabrics from pile material which comprises clamping successive spaced-apart portions of said material, then bringing said clamped portion and a backing cloth into juxtaposition to form a loop, and affixing the loop base to the backing cloth.

5. The method of making pile fabrics from pile material which comprises clamping successive spaced-apart portions of said material, then bringing said clamped portion and a backing cloth into juxtaposition while moving the portion adjacent the clamped portion transversely to form a loop, and affixing the loop base to the backing cloth.

6. The method of making pile fabrics from pile material which comprises clamping successive spaced-apart portions of said material, then bringing said clamped portion and a backing cloth into juxtaposition while pneumatically moving the portion adjacent the clamped portion transversely to form a loop, and affixing the loop base to the backing cloth.

7. The cyclic method of making pile fabrics from pile material which comprises successively looping portions of the pile material and separately affixing each individual loop base when separately formed successively and directly to a moving backing cloth in juxtaposition to the preceding loops.

8. The cyclic method of making pile fabrics from pile material which comprises successively looping portions of the pile material and separately affixing each individual loop base when separately formed successively and directly to a moving backing cloth carrying an adhesive in juxtaposition to the preceding loops.

9. The method of making pile fabrics from pile threads which comprises spacing said threads under tension, then clamping successive portions of said spaced threads, then looping the portion adjacent the clamped portions, and finally affixing the loop base formed to a backing cloth.

10. The method of making pile fabrics from pile material which comprises clamping spaced-apart portions of said material, then looping the clamped portion, and moving obliquely said clamped portion and affixing the loop base formed to a backing cloth.

11. The cyclic method of making pile fabrics from pile material which comprises successively looping portions of the pile material, and then affixing the loop bases formed to a travelling backing cloth while crowding the affixed loop bases in juxtaposition to one another.

12. In the method of making pile fabric from pile material, the step which consists in looping and affixing successive lengths of said material to a backing cloth carrying an adhesive in juxtaposition to preceding loops, while bending the latter to form a convex surface so as to open up the successive affixed loops and crowd the loop bases together.

13. The method of making pile fabrics from pile material which comprises looping and affixing successive lengths of said material to a moving backing cloth while varying the speed of the cloth to vary the spacing of the loops thereon.

14. In the manufacture of a pile fabric from pile material formed in successive loops affixed at their bases to a backing fabric, the method of forming and affixing one of said loops which comprises seizing a portion of said pile material remote from the affixed base of the previous loop, and affixing substantially the seized portion of said pile material adjacent said affixed base of said previous loop.

15. In the manufacture of a pile fabric from pile material formed in successive loops affixed at their bases to a backing fabric, the method of forming and affixing one of said loops which comprises seizing a portion of said pile material remote from the affixed base of the previous loop, affixing substantially the seized portion of said pile material adjacent said affixed base of said previous loop, and releasing the said pile material.

16. In the manufacture of a pile fabric from pile material formed in successive loops affixed at their bases to a backing fabric, the method of forming and affixing one of said loops which comprises seizing a portion of said pile material remote from the affixed base of the previous loop, and bending toward said previous loop the portion between said seized portion and said affixed base, and affixing substantially the seized portion adjacent said affixed base, and releasing said pile material.

17. In the manufacture of a pile fabric from pile material formed in successive loops affixed at their bases to a backing fabric, the method of forming and affixing one of said loops which comprises seizing a portion of said pile material remote from the affixed base of the previous loop, then bending toward said previous loop the portion of the pile material between the seized portion and said affixed base, then affixing substantially the seized portion adjacent said affixed base, then releasing said pile material.

18. In the manufacture of a pile fabric from pile material formed in successive loops affixed at their bases to a backing fabric, the method of forming and affixing one of said loops which comprises seizing a portion of said pile material remote from the affixed base of the previous loop, the portion of the pile material between the seized portion and said affixed base being as seized bent toward said previous loop, then affixing substantially the seized portion adjacent said affixed base, then releasing said pile material.

19. The method claimed in claim 15, in which said pile loop base is otherwise held in affixed position, after releasing the original grasp upon said pile material.

20. The method claimed in claim 14 in which the pile material comprises a plurality of spaced-apart threads.

21. In the manufacture of a pile fabric from a plurality of threads formed in successive loops affixed at their bases to a backing fabric, the method of forming and affixing one of said loops which comprises seizing a portion of each of said threads remote from the affixed base of the previous loop, then bending toward said previous loop the portion of the threads between the seized portion and said affixed base, then affixing substantially the seized portion adjacent said affixed base, then, while otherwise holding the new loop base in affixed position, releasing the original grasp upon the threads and combing said threads under tension away from said new loop base to properly space the threads from one another, then at least partially releasing the tension used in said combing step, and finally releasing said holding of the loop base.

22. In the manufacture of a pile fabric from a plurality of pile threads formed in successive loops affixed at their bases to a backing fabric, the method of forming and affixing one of said loops which comprises seizing a portion of each of said threads remote from the affixed base of the previous loop, the portion of the threads between the seized portion and said affixed base being as seized bent toward said previous loop, then affixing substantially the seized portion adjacent said affixed base, then, while otherwise holding the new loop base in affixed position, releasing the original grasp upon the threads and combing said threads under tension away from said new loop base to properly space the threads from one another, then at least partially releasing the tension used in said combing step, and finally releasing said holding of the loop base.

23. The method claimed in claim 14, in which the backing fabric is moved with relation to the point at which the pile loop is affixed thereon to space the loops along said backing fabric.

24. The method claimed in claim 14, in which the seized portion of said pile material is carried obliquely toward the surface of said backing fabric to crowd the loop bases closely together without disturbing the previous loop.

25. An apparatus for making pile fabrics from pile material which comprises means for clamping said material, and means for bringing said clamping means and seized material into juxtaposition to a backing cloth while simultaneously forming a loop, one of said clamping elements also forcing the loop base against said backing cloth.

26. An apparatus for making pile fabrics from pile material which comprises means for clamping said material, and means for bringing said clamping means and seized material into juxtaposition to a backing cloth while simultaneously forming a loop, one of said clamping elements also forcing the loop base against said backing cloth while the other releases said loop material.

27. An apparatus for making pile fabrics from pile material which comprises means for clamping said material, and means for obliquely bringing said clamping means and seized material into juxtaposition relatively to a backing cloth to form a loop, one of said clamping elements forcing the loop base against said backing cloth.

28. An apparatus for making pile fabrics from pile material which comprises means for clamping said material, means for bringing said clamping means and seized material into juxtaposition to a backing cloth, and means for forming a loop in said material during the movement of said last means, one of said clamping elements forcing the loop against said backing cloth.

29. An apparatus for making pile fabrics from pile material which comprises means for clamping said material, means for bringing said clamping means and seized material into juxtaposition to a backing cloth, and pneumatic means for forming a loop in said material during the movement of said last means, one of said clamping elements forcing the loop against said backing cloth.

30. An apparatus for making pile fabrics from pile material which comprises means for clamping said material, means for bringing said clamping means and seized material into juxtaposition to a backing cloth, and suction means for forming a loop in said material during the movement of said last means, one of said clamping elements forcing the loop against said backing cloth.

31. An apparatus for making pile fabrics from pile material which comprises means for clamping said material, means for bringing said clamping means and seized material into juxtaposition to a backing cloth, and an air blast for forming a loop in said material during the movement of said last means, one of said clamping elements forcing the loop against said backing cloth.

32. An apparatus for making pile fabrics from pile material which comprises means for clamping said material and means for bringing said clamping means and seized material into juxtaposition to a backing cloth to form a loop, both said clamping elements moving obliquely relatively to the cloth to force the loop base against the base of the preceding loop.

33. An apparatus for making pile fabrics from pile material which comprises means for clamping said material, and means for bringing said clamping means and seized material into juxtaposition to a backing cloth moving over a relatively small radius to form a loop, both said clamping elements moving obliquely relatively to the cloth to force the loop base against the base of the preceding loop.

34. In an apparatus for making pile fabrics from pile material, means for clamping said material, means for bringing said means into juxtaposition to a backing cloth, and means for moving one of said clamping elements into clamping relation with the other during the operation of said second means.

35. An apparatus for making pile fabrics from pile material which comprises means for clamping said material, means for feeding said material to said clamping means, and means for bringing said clamping means and seized material into juxtaposition to a backing cloth while simultaneously forming a loop, one of said clamping elements also forcing the loop base against said backing cloth.

36. In an apparatus for making pile fabrics from threads, means for spacing said threads from one another, means for clamping said threads, and means for bringing said clamping means and threads into juxtaposition to a backing cloth while simultaneously forming a loop, one of said clamping elements also forcing the loop base against said backing cloth.

37. In an apparatus for making pile fabrics from threads, means for spacing said threads from one another, means for holding said threads under tension, means for clamping said threads, and means for bringing said clamping means and threads into juxtaposition to a backing cloth while simultaneously forming a loop, one of said clamping elements also forcing the loop base against said backing cloth.

38. In an apparatus for making pile fabrics from threads, means for spacing said threads from one another, means for holding said threads under variable tension, means for clamping said threads, and means for bringing said clamping means and threads into juxtaposition to a backing cloth while simultaneously forming a loop, one of said clamping elements also forcing the loop base against said backing cloth.

39. In an apparatus for making pile fabrics from threads, means for spacing said threads from one another, means comprising a plurality of reeds in offset relation for bringing said threads under tension, means for clamping said threads, and means for bringing said clamping means and threads into juxtaposition to a backing cloth to form a loop, one of said clamping elements forcing the loop base against said backing cloth.

40. In an apparatus for making pile fabrics from pile material, means for forming loops from successive portions of said material, a backing cloth carrying an adhesive, means for bringing said looping means and cloth into juxtaposition, means for moving said cloth in synchronism with said looping means, and means for varying the relative speeds of said looping means and cloth moving means.

41. In an apparatus for making pile fabrics from pile material, coacting means for forming loops from successive lengths of said material and means for varying the stroke of said looping means to control the height of the pile.

42. In an apparatus for making pile fabrics from pile material, means for bending said material to initiate a loop therein, means for clamping the partially formed loop, and means for bringing said clamping means and partially looped material into juxtaposition with a backing cloth to complete a loop while securing the loop base to said cloth.

43. In an apparatus for making pile fabrics from pile material, means for supplying a backing cloth coated with pyroxylin, means for softening said coating, means for bringing looped pile material into juxtaposition with said backing cloth to affix the loop bases to said cloth, means for preventing the softened coating from adhering to said loop-carrying means, and means for drying the pile fabric formed to secure said loop bases in said pyroxylin coating on said cloth.

44. An apparatus for making pile fabrics from pile material formed in successive loops affixed at their bases to a backing fabric having, in combination, at least two coacting elements to press successive portions of said pile material as loop bases against said backing fabric, and means for successively clamping substantially said successive portions of pile material to one of said coacting elements.

45. An apparatus for making pile fabrics from pile material formed in successive loops affixed at their bases to a backing fabric having, in combination, at least two coacting elements to press successive portions of said pile material as loop bases against said backing fabric, means for successively clamping substantially said successive portions of pile material to one of said coacting elements, and means for bending the portions of pile material between the portions clamped and the previously pressed portions.

46. The combination claimed in claim 44, in which the movement of the elements is adjustable to vary the height of the pile.

47. An apparatus for making pile fabrics from pile material formed in successive loops affixed at their bases to a backing fabric having, in combination, at least two coacting elements to press successive portions of said pile material as loop bases against said backing fabric, means for successively clamping substantially said successive portions of pile material to one of said coacting elements, means for bending the portions of pile material between the portions clamped and the previously pressed portions, and means for moving said backing fabric relatively to the point at which said loop bases are pressed to space said loops successively along said backing fabric.

48. The combination claimed in claim 47, in which the movement of said backing fabric is adjustable in relation to the frequency of cycle of the other means to vary the spacing of said pile loops along said backing fabric.

49. The combination claimed in claim 44, in which one of said coacting elements includes a roller carrying said backing fabric.

50. An apparatus for making pile fabrics from pile material formed in successive loops affixed at their bases to a backing fabric having, in combination, at least two coacting relatively movable elements to press successive portions of said pile material as loop bases against said backing fabric, means for successively clamping substantially said successive portions of pile material to one of said coacting elements, and spacing means across the backing fabric when said pile material comprises a plurality of threads.

51. The combination claimed in claim 50, in which said thread spacing means are removable and interchangeable to vary the spacing of the threads.

52. The combination claimed in claim 50, in which are included means for tensioning the threads in conjunction with said thread spacing means before said threads are clamped.

53. The combination claimed in claim 45, in which the bending means include a pneumatic device.

54. An apparatus for making pile fabrics from pile material formed in successive loops affixed at their bases to a backing fabric having, in combination, at least two coacting relatively movable elements to press successive portions of said pile material as loop bases against said backing fabric, means for applying an adhesive in a tacky state between the pile loop bases and the backing fabric for affixing said loop bases to said fabric, and means for successively clamping substantially said successive portions of pile material to one of said coacting elements.

55. The combination claimed in claim 54, in which are included means for preventing adhesion of said tacky adhesive to other of said means comprising means for interposing an adhesive solvent between said adhesive and said other means.

56. In the manufacture of a pile fabric from pile material formed in successive loops affixed at their bases to a backing fabric, the method of forming and affixing one of said loops which comprises seizing a portion of said pile material remote from the affixed base of the previous loop, and affixing substantially the seized portion of said pile material adjacent said affixed base of said previous loop by adhesive.

57. In the manufacture of a pile fabric from pile material formed in successive loops affixed at their bases to a backing fabric, the method of forming and affixing one of said loops which comprises seizing a portion of said pile material remote from the affixed base of the previous loop, and affixing substantially the seized portion of said pile material adjacent said affixed base of said previous loop by adhesive in a tacky condition when said loops are affixed therein.

58. In the manufacture of a pile fabric from pile material formed in successive loops affixed at their bases to a backing fabric, the method of forming and affixing one of said loops which comprises seizing a portion of said pile material remote from the affixed base of the previous loop, and affixing substantially the seized portion of said pile material adjacent said affixed base of said previous loop by adhesive and setting the adhesive to a substantially permanent state after said pile loops are affixed therein.

59. An apparatus for making pile fabrics from pile material formed in successive loops affixed at their bases to a backing fabric having, in combination, at least two coacting elements to press successive portions of said pile material as loop bases against said backing fabric, means for successively clamping substantially said successive portions of pile material to one of said coacting elements, thread spacing means across the backing fabric when said pile material comprises a plurality of threads, and means for tensioning the threads in conjunction with said thread spacing means before said threads are clamped, said tension of the threads from the last previously formed loop base occurring during travel of said clamping means away from said base.

GEORGE BERKELEY REED.